Aug. 25, 1942.  L. F. G. BUTLER ET AL  2,293,967
HYDRAULICALLY-OPERATED CLUTCH
Filed May 20, 1940  4 Sheets-Sheet 1
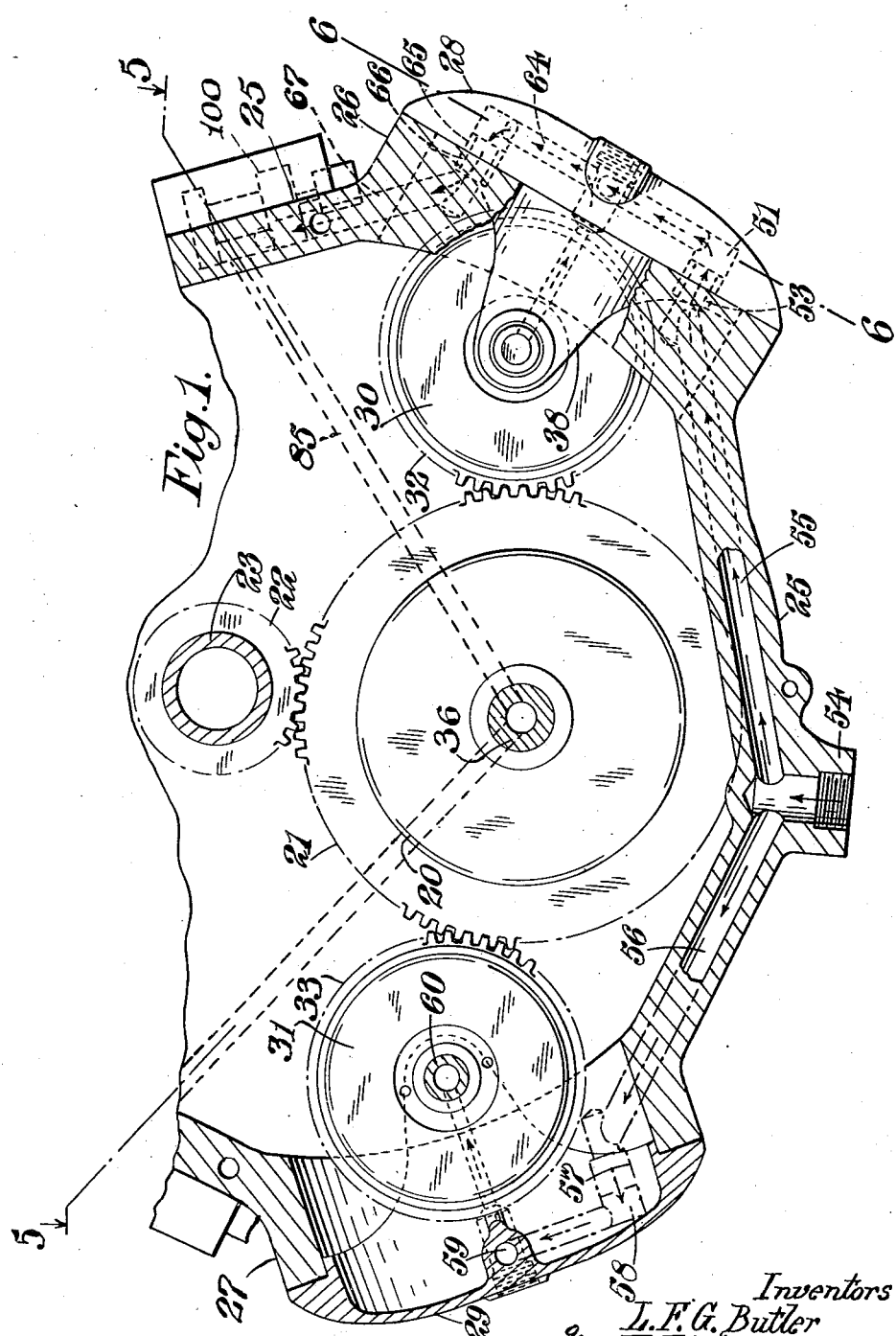
Inventors
L. F. G. Butler
and H. T. Underwood
by Wilkinson & Mawhinney
Attorneys.

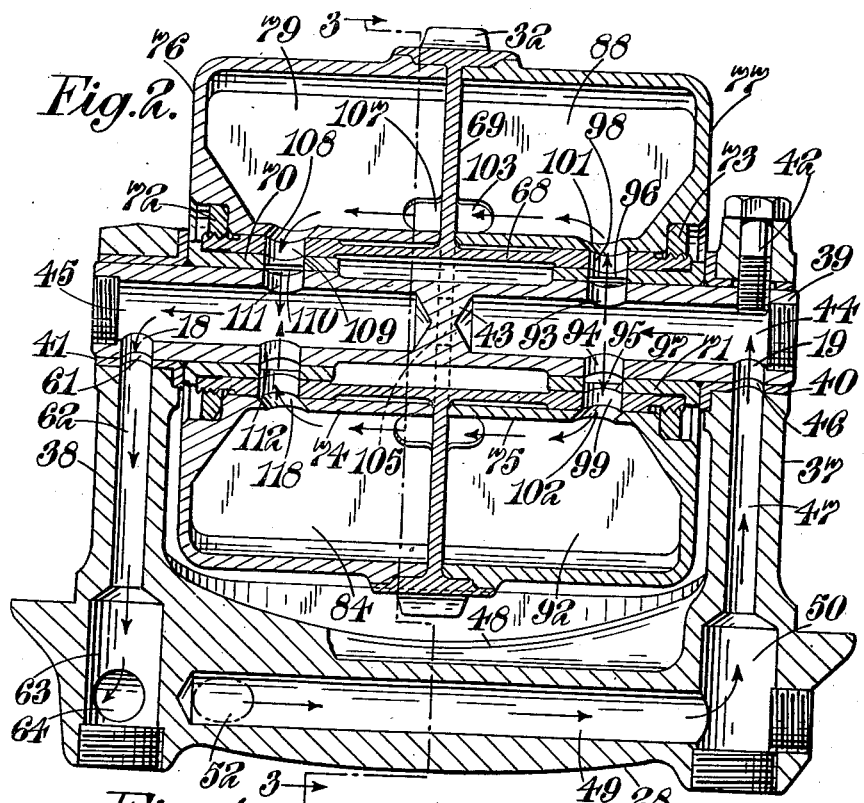
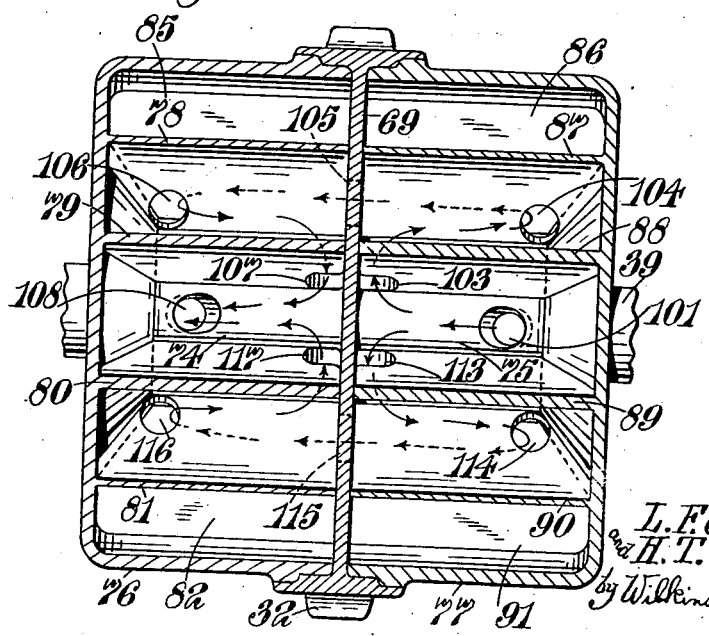

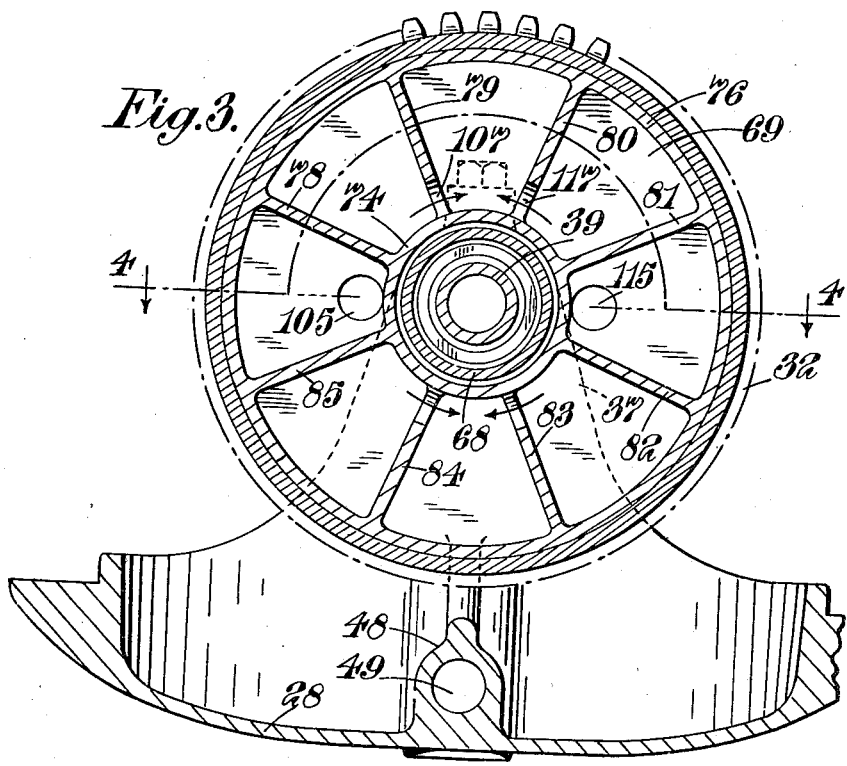

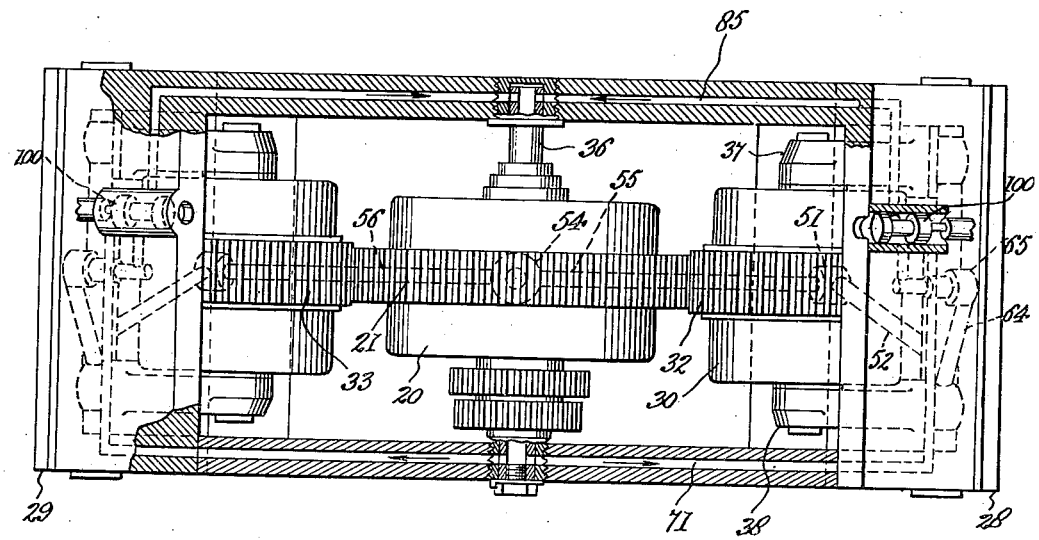
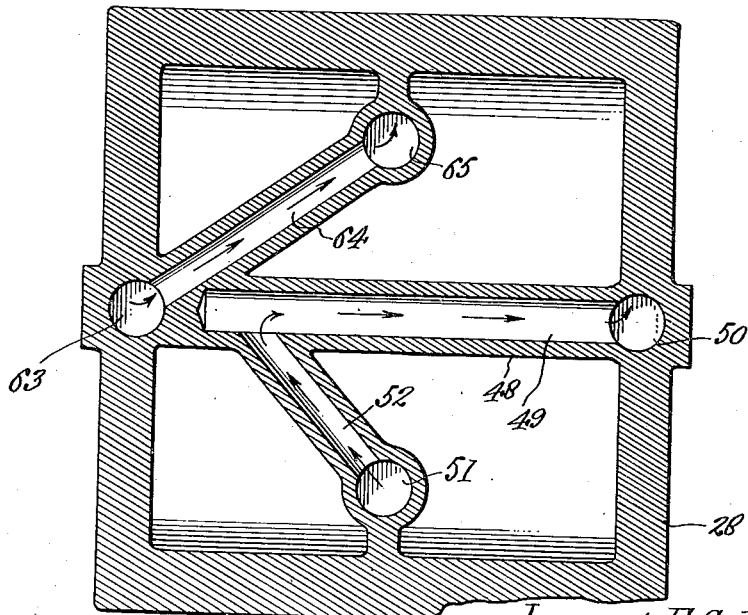

Patented Aug. 25, 1942

2,293,967

UNITED STATES PATENT OFFICE 2,293,967

HYDRAULICALLY OPERATED CLUTCH

Leonard Frederick George Butler and Harry Thomas Underwood, Bristol, England, assignors to The Bristol Aeroplane Company Limited, Bristol, England, a British company Application May 20, 1940, Serial No. 336,303
In Great Britain August 11, 1939

2 Claims. (Cl. 192—85)

This invention relates to hydraulically-operated clutches of the kind in which the hydraulic liquid is subjected to rotation within the clutch-mechanism. It is found that the resulting centrifugal force causes the separation of fine solid particles (herein termed "sludge") from the liquid the accumulation of which sludge within the clutch tends to interfere with the proper working of the mechanism. The sludge is too fine to be removed by an ordinary filtering process and the invention therefore provides, in combination with a clutch of the kind described, a centrifugal separator (herein termed a "centrifuge") separate from the clutch but driven in company therewith, and means for supplying to the clutch-mechanism only liquid which has passed through the centrifuge. The centrifuge is preferably gear-driven by a rotating clutch-part to which the liquid is admitted so that the centrifuge is operated whenever the said part is rotating.

A specific embodiment of the invention will now be described, by way of example, with reference to the accompanying drawings in which:

Figure 1 is a sectional rear elevation through the volute casing of a supercharged radial-cylinder internal-combustion engine, in which the supercharging blower is driven through gearing including a hydraulically-actuated friction clutch, Figure 2 is a sectional elevation of one of the centrifuges of Figure 1, Figure 3 is a section on the line 3—3 of Figure 2, and Figure 4 is a plan, being a section on the line 4—4 of Figure 3 but arranged in the same manner as the corresponding parts of Figure 2.

Figure 5 is a horizontal sectional view taken on the line 5—5 of Figure 1.

Figure 6 is a transverse sectional view taken along the line 6—6 of Figures 1 and 2.

As shown in Figure 1, the impeller-shaft 23 carries a pinion 22 which is engaged by a gear 21 carried by the rotatable casing 20 of a hydraulically-actuated friction clutch such as that described in British Patent No. 465,612. The casing 20 and teeth 21 are rotated by the driven member of the clutch, the driving member of the clutch being driven by a pinion (not shown) on a shaft 36. The pinion meshes with a gear carried by the engine crank-shaft. The clutch-mechanism described in the specification above referred to forms a change-speed gear whereby the impeller-shaft 23 can be driven either at one speed or at another in relation to the engine shaft. However, the present invention can be applied to any hydraulically-actuated clutch in which the hydraulic liquid is subjected to rotation within the clutch-mechanism, and is not limited to a two-speed system.

The casing 25 is formed with facings 26, 27, which receive, spigoted into them, bearing-cradles 28, 29, for two oil centrifuges, denoted generally in Figure 1 by the numerals 30 and 31. Each centrifuge carries a gear 32, 33, respectively, meshing with the gear 21 on the clutch-housing 20. Each centrifuge is constructed in the manner which will now be described with reference to Figures 2, 3 and 4. The cradle 28 is integrally formed with forward and rearward brackets 37, 38, respectively, which carry a fixed hollow spindle 39 in bushes 40, 41, the spindle being locked against movement by a suitable bolt 42 in the bracket 37.

The spindle is hollow except for a central partition 43 so as to provide two central conduits 44 and 45 for oil. The conduit 44 is penetrated by a radial port 19 which registers with a suitable hole 46 in the bush 40 and with a conduit 47 passing through the interior of the bracket 37. The base of the cradle 28 is formed with a rib 48 the interior of which is drilled to form a transverse conduit 49 which communicates with the conduit 47 by way of an enlargement 50. At a suitable angle to the conduit 49 it is penetrated by a conduit 52 which (see Figures 1 and 6) opens into an enlarged recess 51 in the cradle 28, the recess registering with a recess 53 in the casing 25. Oil from the lubrication system of the engine is fed to a union 54 from which a conduit 55 leads to the recess 53 above referred to. A similar conduit 56 leads by way of co-operating recesses 57 (in the housing 25) and 58 (in the cradle 29), to a conduit 59 from which the oil is fed to the forward end of the hollow spindle 60 of the centrifuge 31. In Figure 1 the cradle of the centrifuge 31 is shown in section and the cradle 30 in elevation. The centrifuges are identically similar in construction.

The conduit 45 in the rear end of the spindle 39 communicates through a radial port 18, and a hole 61 in the bush 41, with a conduit 62 formed in the bracket 38. The conduit opens into an enlargement 63 with which a transverse conduit 64 communicates. As shown in Figures 1 and 6, the conduit 64 leads to a recess 65 which registers with a recess 66 in the casing 25 and from this recess a conduit 67 leads to a clutch-controlling valve which is shown in Figure 5 of the drawings at 100 and which may be similar to the valve 100 shown in Figure 1 of British Patent No. 465,612.

As more fully described in the British Patent No. 465,612, oil passes from the sump or other source through such valve 100 to one side of the clutch while oil from the other side of the clutch passes through the valve 100 back to the sump or other source of supply. Where more than one centrifuge is employed, a corresponding number of valves may be used or all may connect with the same valve. In the present invention, oil passing from the sump to the valve 100 for use in the clutch must first pass through one of the oil centrifuges via union 54 and one of the conduits 55 or 56. When leaving the centrifuge 30, the cleaned oil passes through conduit 67 to valve 100 and then to the clutch. Oil forced out of the clutch returns through the valve 100 to the sump.

In Figure 5 is shown a sectional view looking down upon the top of the clutch 21. Two valves 100 are shown, one for each of the centrifuges employed. As indicated by the arrows, oil is passing from each valve 100 through conduits 85 to the spindle 36 of clutch 20 to move the clutch in one direction. This operation forces oil from the other side of the clutch out through conduits 71 to the valves 100 from whence it is returned to the sump of the engine lubrication system. When the clutch is to be operated in the opposite direction, oil passes through conduit 71 to the clutch and from the clutch through conduit 85 to the valves and back to the sump. The direction in which the oil travels is controlled by the valves 100.

Conduits and recesses similar to 64, 65, 66 and 67 are also provided for the centrifuge 31.

The spindle 39 is surrounded by a hollow shaft 68 with which a central circular diaphragm 69 and the gear-teeth 32, already referred to, are integrally formed. The shaft 68 is separated from the centrifuge by bushes 70, 71, of bearing metal to which the shaft is secured. The shaft 68 is surrounded by the innermost walls 74, 75, of two open-ended cylinders 76, 77, the open ends abutting against the diaphragm 69 and the cylinders being held together by nuts 72, 73, engaging the tubular shaft 68. Each cylinder 76, 77, is integrally formed with eight radial vanes or webs, the vanes in the cylinder 76 being denoted by the numerals 78 to 85. Only seven of the vanes, numbered 86 to 92, of the cylinder 77 can be seen in the drawings, it being sufficient to state that the two cylinders and their vanes are identically similar, each being an image of the other in the plane of the diaphragm 69.

The arrangement of the various ports in the spindle, shaft and vanes will now be explained with reference to the flow of oil through the centrifuge. The oil enters the union 54, flows along the conduits 55, 49, 47, into the central conduit 44 in the spindle 39. From this conduit the oil flows through ports 93 and 94 in the spindle 39 to an internal groove 95 in the bush 71. The bush is formed with ports 96, 97, registering with ports 98, 99, respectively in the shaft 68 and with ports 101, 102, in the central tubular portion 75 of the cylinder 77. The oil flowing through the port 101 enters the space between the vanes 88 and 89. In this space as in all the other spaces between the vanes, the oil is subjected to centrifugal force whereby fine particles of sludge separate from the pure oil and are deposited on the inside of the outer wall of the cylinder 77. The partition 88 is formed at its left-hand end (see Figures 2 and 4) with a port 103 through which the oil flows into the space between the vanes 87, 88. The vane 87 is formed at its right-hand end with a port 104 through which the oil leaves this compartment and enters the compartment between the vanes 86 and 87. From this compartment the oil flows through a hole 105 in the diaphragm 69 into the compartment between the vanes 78 and 85 in the cylinder 76. At the left-hand end (see Figure 4) of the vane 78 it is formed with a hole 106 through which the oil flows into the space between the vanes 78 and 79. At the right-hand end of the vane 79 it is formed with a port 107 through which the oil flows into the space between the vanes 79 and 80. From this space the oil flows radially inwards through a port 108 in the central cylindrical portion 74 of the cylinder 76, a port 109 in the shaft 68, a groove 110 in the bush 70 and ports 111 and 112 in the spindle 39, into the central conduit 45 at the rear end of the spindle. From this point the cleaned oil flows by way of the ports 18 and 61, the conduits 62, 64, and 67, to the control-valve of the hydraulic clutch.

Half of the oil which enters the compartments 88, 89, through the port 101 will follow the path above described. The other half flows through a hole 113 in the vane 89, a hole 114 in the vane 90, a hole 115 in the diaphragm 69, a hole 116 in the vane 81, a hole 117 in the vane 80 to the port 108, where the two streams of oil reunite. In like manner the oil which flows through the port 102 into the compartment at the bottom of the cylinder 77 flows to and fro through the compartments to the holes 105 and 115 and the oil which flows from these holes to the port 108 splits into two paths one of which has already been described and the other of which is identically similar but takes place through the compartments between the vanes 85, 84; 82, 83 and 83, 84, to the port 118 from which it flows to the port 112 in the interior of the spindle.

It will be seen from the arrows in Figures 2, 3 and 4 that from one end of the centrifuge to the other the oil follows a long zig-zag path during which it is continuously subjected to centrifugal force whereby the sludge is separated from it.

The centrifuge 31 acts in the same manner, the cleaned oil from both centrifuges flowing to the control-valve.

The gears 32 and 33 by which the centrifuges are driven are conveniently of smaller diameter than the gear 21 so that the centrifuges are driven at a high speed.

It will be seen that the invention ensures that, whenever the clutch-housing 21 is rotating, the centrifuges operate to remove sludge from the oil supplied to it. In this way, obstruction to the free movement of the piston, clutch-member, and other parts within the housing 20 is prevented.

We claim:

1. The combination with a hydraulically-operated clutch of the kind in which the hydraulic liquid is subjected to rotation within the clutch mechanism of a centrifuge separate from the clutch and gear-driven by a rotating clutch part to which liquid is admitted, and means for supplying to the said centrifuge only liquid which is to be passed to the clutch mechanism.

2. In an internal combustion engine, the combination with the liquid pressure lubricating system thereof, of a hydraulically operated clutch of the type in which the hydraulic liquid is subjected to rotation within the clutch mechanism, said clutch having a rotatable driving element and a driven element, a centrifuging liquid cleaner operatively connected to the driven element of said clutch to be operated thereby, means to convey liquid under pressure from the engine lubricating system to the centrifuging cleaner and from the cleaner to the clutch mechanism, and means to return the liquid from the clutch to the engine lubricating system.

LEONARD FREDERICK GEORGE BUTLER.
HARRY THOMAS UNDERWOOD.